United States Patent [19]

Kolitsch et al.

[11] 4,448,081
[45] May 15, 1984

[54] METHOD AND DEVICE FOR THE DYNAMIC AND DENSITY-INDEPENDENT DETERMINATION OF MASS FLOW

[75] Inventors: Jörg Kolitsch, Munich; Norbert Sparwell, Troisdorf; Eugen Brockmann, Bad Soden am Taunus, all of Fed. Rep. of Germany

[73] Assignee: Battelle-Institut e.V., Frankfurt am Main, Fed. Rep. of Germany

[21] Appl. No.: 295,021

[22] Filed: Aug. 21, 1981

[30] Foreign Application Priority Data

Aug. 29, 1980 [DE] Fed. Rep. of Germany ....... 3032578

[51] Int. Cl.³ ............................................... G01F 1/86
[52] U.S. Cl. ............................. 73/861.03; 73/861.22; 73/861.24
[58] Field of Search ........... 73/861.22, 861.24, 861.02, 73/861.03

[56] References Cited

U.S. PATENT DOCUMENTS

| 1,935,445 | 11/1933 | Heinz | 73/861.24 |
|---|---|---|---|
| 3,587,312 | 6/1971 | McMartrie | 73/204 |
| 3,719,073 | 3/1973 | Mahon | 73/861.22 |
| 3,863,501 | 2/1975 | Janssen | 73/861.24 |
| 3,878,716 | 4/1975 | Asada | 73/861.24 |
| 3,885,432 | 5/1975 | Herzl | |
| 3,888,120 | 6/1975 | Burgess | 73/861.24 |
| 3,927,566 | 12/1975 | Zanker | 73/861.24 |
| 3,972,232 | 8/1976 | Miller et al. | |
| 4,010,645 | 3/1977 | Herzl | 73/861.03 |
| 4,171,643 | 10/1979 | Frick | 73/861.24 |
| 4,281,553 | 8/1981 | Datta-Borua | 73/861.24 |
| 4,285,246 | 8/1981 | Kita | 73/861.03 |

FOREIGN PATENT DOCUMENTS

| 2037198 | 2/1972 | Fed. Rep. of Germany . |
| 1498271 | 3/1972 | Fed. Rep. of Germany . |
| 2408246 | 9/1975 | Fed. Rep. of Germany . |
| 2827985 | 5/1979 | Fed. Rep. of Germany . |
| 55-82018 | 6/1980 | Japan .......... 73/861.22 |

*Primary Examiner*—Herbert Goldstein
*Attorney, Agent, or Firm*—Fisher, Christen & Sabol

[57] ABSTRACT

Method for the dynamic and density-independent determination of the mass flow of fluids. A single vortex generating bluff body is placed in the flow to generate vortices according to the principle of the Karman vortex path. The dynamic pressure ($\frac{1}{2}\rho v^2$) is determined via the effect of the drag directly at this bluff body. The velocity of flow (v) is determined via the effect of the vortex shedding at the bluff body. The mass flow is determined according to the equation:

$$\dot{m} = 2 \cdot (\tfrac{1}{2}\rho v^2) \cdot \tfrac{1}{v} \cdot A$$

wherein A is the cross section of the flow channel.

Device for implementing such method. The device consists essentially of a vortex-generating bluff body having one or two fixed ends, which itself serves as a transducer or at which one or two transducers are provided. An electronic system for processing the resultant signal is available.

15 Claims, 15 Drawing Figures

Fig. 6
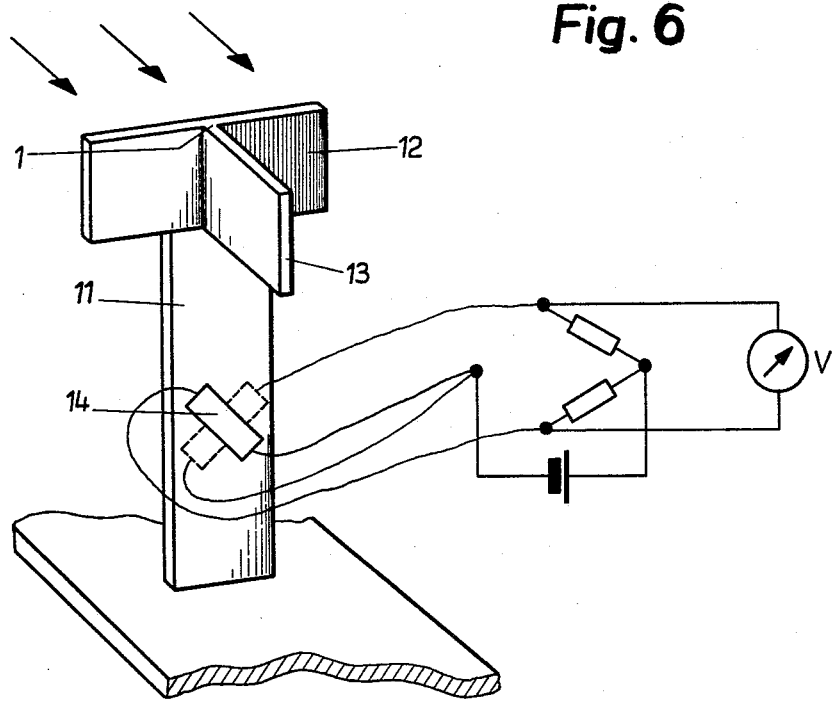
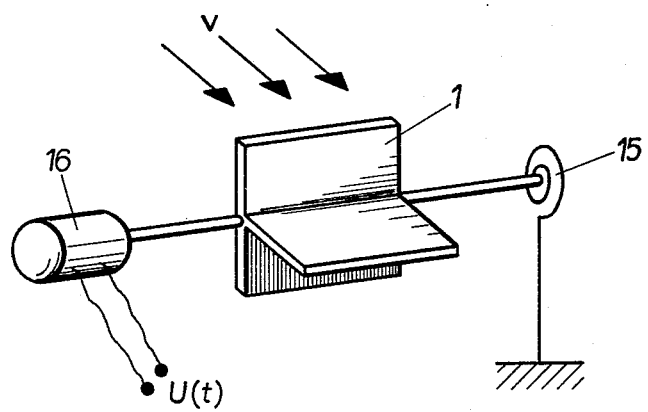
Fig. 7

METHOD AND DEVICE FOR THE DYNAMIC AND DENSITY-INDEPENDENT DETERMINATION OF MASS FLOW

BACKGROUND OF THIS INVENTION

1. Field of This Invention

The invention relates to a method for the dynamic and density-independent determination of the mass flow of fluids and to devices for implementing this method. According to this invention, velocity and dynamic pressure of the fluid are determined at the same time and at the same place on one single vortex-generating bluff body placed in the flow and combined to give the resultant quantity "mass flow".

2. Prior Art

The conventional methods for determining the mass flow are normally based on measurements of the volumetric flow or of the velocity and the density of the medium and on the subsequent calculatory combination of these two measured values. Dynamic real time measurements of density are normally possible only in such media having chemical composition and thermodynamic functions of state which are known. This is, however, not the case in many technical applications. Even if the composition and the functions of state are known, the determination of density requires high measuring effort because it is necessary to measure pressure and temperature and to calculate the density from these data.

The devices used for various methods to determine the volumetric flow or the flow velocity possess movable parts, e.g., revolving vane aneometer and rotating lobe meter, and therefore are particularly susceptible to wear and contamination. Also methods involving pressure measurements, e.g., orifice measurements, and dynamic pressure measurement, which require transducer bores, pressure pipes and membranes, are often subject to contamination of the medium by solid particles or the like, which leads to substantial measuring errors or requires increased maintenance work for the measuring equipment. In addition, many of the conventional methods involve a high pressure loss due to the measuring device. Flow meters operating according to the principle of the Karman vortex path are already known (Vortex Shedding Meter, e.g., U.S. Pat. No. 3,587,312, German OS No. 28 27 985, U.S. Pat. No. 3,972,232, German OS No. 24 08 246, and German OS No. 20 37 198). These methods and devices are, however, only suited to measure the velocity and are not suitable for measuring the mass flow.

Approaches to determine the mass flow through the swirling of the fluid by bluff bodies are also known (e.g., the so-called swirl meter, U.S. Pat. No. 3,885,432 and German AS 14 98 271): by pressure measurement at the vortices, one single signal is obtained whose frequency is a measure of the velocity of the fluid and whose amplitude is a measure of the kinetic energy of the vortices. There is, however, no clear relationship which would permit conclusions to be drawn from the kinetic energy of the vortices on the kinetic energy of the fluid, particularly if the fluid is contaminated or contains constituents of different phases. In addition it should be noted that for an exact measurement the vortices must be well developed, which results in a high pressure loss.

BROAD DESCRIPTION OF THIS INVENTION

The objective of the present invention therefore is to create a simple method and a measuring device which permit dynamic determination of the mass flow without knowing the density of the flowing medium, i.e., even without being dependent on fluctuations of the chemical composition, the density and the velocity of the fluid. In addition, the device should not contain any movable parts, should show low susceptibility to contamination and should not produce an excessive pressure loss at the measuring point.

It has been found that this objective can be reached by the method of the invention which directly measures the kinetic energy of the flow or the dynamic pressure. The method of the invention is a method for the dynamic and density-independent determination of the mass flow of fluids. A single vortex generating bluff body is placed in the flow to generate vortices according to the principle of the Karman vortex path. The dynamic pressure is determined via the effect of the drag directly at the bluff body. The velocity of flow is determined via the effect of the vortex shedding at the bluff body. The mass flow is determined according to equation I below. This invention also includes a device for implementing the invention method. The device includes a vortex-generating bluff body with one or two ends fixed, which itself serves as a transducer or at which one or two transducers are provided. An electronic system for processing the resultant signal is provided.

DETAILED DESCRIPTION OF THIS INVENTION

The objective of density-independent mass flow determination can be accomplished according to the invention by measuring the velocity v and the dynamic pressure ($\frac{1}{2}\rho v^2$) on one single vortex-generating bluff body placed in the flow and combining these two values to give the mass flow $\dot{m}$ according to the relation $$\dot{m} = 2(\tfrac{1}{2}\rho v^2)\cdot(1/v)\cdot A \qquad \text{I}$$

wherein A is the cross section of the flow channel.

The vortex-generating bluff body arranged normal to the direction of flow on the one hand causes periodical shedding of vortices at its rear side. The shedding frequency f of these vortices is:

$$f = (Str \cdot v)/d \qquad \text{II}$$

wherein Str is the Strouhal number, v is the flow velocity and d is the characteristic thickness of the bluff body. The Strouhal number can be determined experimentally as a function of the Reynolds number for any cross-sectional profile of the bluff body. According to equation II, measurement of the vortex frequency will thus immediately supply the desired flow velocity value. In many cases this is facilitated by the fact that the Strouhal number is constant in wide ranges of the Reynolds number.

On the other hand, the vortex-generating bluff body offers mechanical resistance to the flow. The force exerted by the flow on an elastically deformable or elastically supported body can be measured by the elastic deformation occuring at the body or the support according to a known spring characteristic. The relation existing between this flow force $F_w$ and the dynamic pressure of the flow $(\frac{1}{2}\rho v^2)$ is $$F_w = c_w(\tfrac{1}{2}\rho v^2) \cdot A_w \qquad \text{III}$$

wherein $c_w$ is the drag coefficient and $A_w$ is the surface of the body exposed to the flow. The drag coefficient can be determined experimentally as a function of the Reynolds number for any cross-sectional profile of the vortex-generating bluff body. Measurement of the deformation of the bluff body yields the flow force via the spring characteristic and thus the desired dynamic pressure according to equation III. In many cases this is facilitated by the fact that the drag coefficient is constant within wide ranges of the Reynolds number.

It is also possible to determine the dynamic pressure directly at a rigid body by providing a pressure bore opposite to the direction of flow and measuring the total pressure of the flow. The dynamic pressure is obtained by a differential arrangement with a pressure measuring bore at which the static pressure of the flow is measured.

According to the invention, it is not necessary to measure the fluid density for determining the mass flow. In addition to the velocity $v$, which is immediately obtained as the result of the vortex frequency measurement, the density $\rho$ can nevertheless be calculated simply from the dynamic pressure $(\frac{1}{2}\rho v^2)$ and the velocity, using the relation $$\rho = (\tfrac{1}{2}\rho v^2) \cdot (2/v^2) \qquad \text{IV}$$

The measuring method is based on the principle that one single vortex-generating bluff body is placed in the flow and that both the frequency of the vortices shed by this body and the flow force acting on this body are obtained as measured quantities.

The frequency of the shedding vortices can be measured directly at the bluff body because the alternating shedding of vortices at the two sides of the flow around the body causes a corresponding periodical pressure gradient at the body normal to the direction of flow and excites the bluff body to oscillate normal to the direction of flow at the vortex frequency. This behavior can also be described by means of the buoyancy force $F_A$ at the body and a buoyancy coefficient $c_A(t)$ periodically variable with time, using the relation:

$$F_A(t) = c_A(t) \cdot (\tfrac{1}{2}\rho v^2) \cdot A_A \qquad \text{V}$$

wherein $(\frac{1}{2}\rho v^2)$ is the dynamic pressure and $A_A$ is the surface of the body exposed to buoyancy. The oscillating deformation of an elastic or elastically supported vortex-generating bluff body can then be directly determined as an electric signal by means of strain gauges, piezoresistive transducers or other displacement-measuring transducers, the frequency of the signal being equal to the vortex frequency and yielding the velocity of flow according to equation II.

If the cross-sectional profile of the bluff body is not symmetric in the direction of the buoyancy force, torsion or deviation phenomena occur in addition to bending. These displacement and angular changes can also be used for measuring in order to determine the buoyancy force.

The rotary motion can be measured especially on a rigid pivoted vortex-generating bluff body; in this case the angle of rotation that varies with time is proportional to the buoyancy force and thus also to the product $c_A(t) \cdot (\rho/2) v^2$, which corresponds to the amplitude of the measured signal. At the same time it is possible to determine the vortex shedding frequency and thus the velocity of flow from the frequency of the signal.

Another potential method of vortex frequency measurement consists in mounting one ultrasonic transmitter and one ultrasonic receiver downstream of the bluff body at two opposite boundary surfaces of the flow parallel to the bluff body, where the vortices are particularly well developed. When a vortex passes the ultrasonic path the vortex as density fluctuation modulates the acoustic signal. The frequency of these modulations is equal to the vortex frequency.

The flow force can be determined indirectly via the elastic deformation or deflection of the vortex-generating bluff body or of its support in the direction of flow by means of strain gauges, piezoresistive transducers or other displacement transducers. For this determination the spring characteristic of the body and the load distribution, i.e., the flow profile, must be known. By means of the drag coeffizient $c_w$ it is then possible with the aid of equation III to calculate the dynamic pressure.

It is also possible to measure the deflection of the vortex-generating bluff body both in the direction of flow and normal to it simultaneously with one signal. In this case the total elastic deformation due to the total force resulting from drag force and buoyancy force $$F = \sqrt{F_w^2 + F_A^2} \qquad \text{VI}$$

is measured where the mean amplitude of the oscillating measuring signal corresponds to the deflection due to the flow force and the frequency of the oscillations corresponds to the vortex frequency. This combined signal determination is technically feasible, for example, by measuring the change in the electric resistance of the current-conducting vortex-generating bluff body or current-conducting parts thereof, which is proportional to the linear expansion of the body due to its deflection. Strain gauges, piezoelectric transducers or other displacement transducers fixed to the bluff body are also regarded as current-conducting parts, the total oscillating deformation being determined by only such one transducer.

According to the invention, the vortex-generating bluff body must be so dimensioned and shaped for the various flow velocity ranges and fluids that both the vortex shedding and the drag force of the body acting against the flow fall into particularly favorable measuring ranges were limited variations or fluctuations of the fluid properties, such as, density, viscosity, chemical composition and velocity do not result in marked measuring errors.

Particularly suitable vortex-generating bluff bodies are smooth bars having a cross-sectional profile in the direction of flow which is symmetrical. To achieve well-defined vortex shedding at a specific point, sharp edges can be provided at the rear side of the profile. To increase the oscillating differential pressure caused by the shedding of vortices in the direction normal to the direction of flow, it is possible to additionally provide one or more surfaces parallel to the direction of flow at the rear end of the profile. To deflect and prevent deposition of dirt particles, solid particles, liquid droplets, etc., which may be contained in the fluid, it is also possible to accordingly design the front end of the profile to achieve such object. In cases where the flexural deformations of the vortex-generating bluff body, both in the direction of flow and normal to the direction of flow are to be used in the measurement it is also possible to optimize the bending properties of the bluff body by splitting it into two parts along its axis, each of the two parts having the most favorable areal moment of inertia in one of the directions. The two parts are fixed at the ends, thus forming one single vortex-generating bluff body. The axial distance of the two parts is determined by the maximum deflection of the front part in the direction of flow.

Since in guided flow channels, e.g., a tube, the Strouhal number Str and the drag coeffizient $c_w$ may depend on the contraction coefficient, i.e., on the ratio of the surface of the vortex-generating bluff body exposed to the flow to the channel cross section, artificial contraction may be caused in favorable cases (e.g. large channel diameters and slimm bluff bodies). This is made particularly possible by mounting two guide plates parallel to the direction of flow and to the bluff body, at a distance from the bluff body to be determined. These guide plates can also be curved parallel to the channel wall so that a coaxial inner channel is formed where the actual measurement is made, while only a specific part of the mass flow passes through the inner channel. The inner channel is positioned in the larger channel by supports—said supports are hollow, thereby permitting the electric signal measuring lines to be passed therethrough. The extension of the guide plates in the direction of flow in front of and behind the bluff body and their thickness must be so dimensioned that the flow within the inner channel is hydrodynamically fully developed. The inlet edges of the guide plates should preferably be well rounded.

The advantage of the method according to the invention over the known methods for mass flow determination consists in the fact that it permits the dynamic measurement of mass flow without knowing the density of the flowing medium, by placing one single vortex-generating bluff body in the flow. The cross-sectional profile of the bluff body can be designed such that the measurement is—within certain limits—independent of fluctuations in chemical composition, density, viscosity and velocity of the fluid. In addition, the method has little susceptibility to contamination of the fluid and on the whole requires little maintenance, as there are no movable parts. Suitable design will result in low pressure loss at the measuring device. By directly measuring the flow force, the mass fractions of impurities or constituents of different phases in the fluid are also taken into account in the total mass flow.

DESCRIPTION OF THE DRAWINGS

Below, the invention is described in detail on the basis of schematically simplified drawings. In the drawings:

FIG. 6 shows an embodiment according to the invention where a rigid vortex-generating bluff body is elastically supported;

FIG. 7 shows a device which contains a pivoted, rigid vortex-generating bluff body;

If a vortex-generating bluff body is placed in the flow, periodical vortex shedding occurs. The flow forces acting on the bluff body, i.e., the drag force $F_w$ and the periodic buoyancy forces $F_A$ ($F_A$ being perpendicular to $F_w$), result in a deformation of the elastic vortex-generating bluff body or its elastic support (see FIG. 3.). In this context the term vortex-generating bluff body was selected instead of drag body because the body is to generate vortices apart from measuring the drag force.

Figure 1:
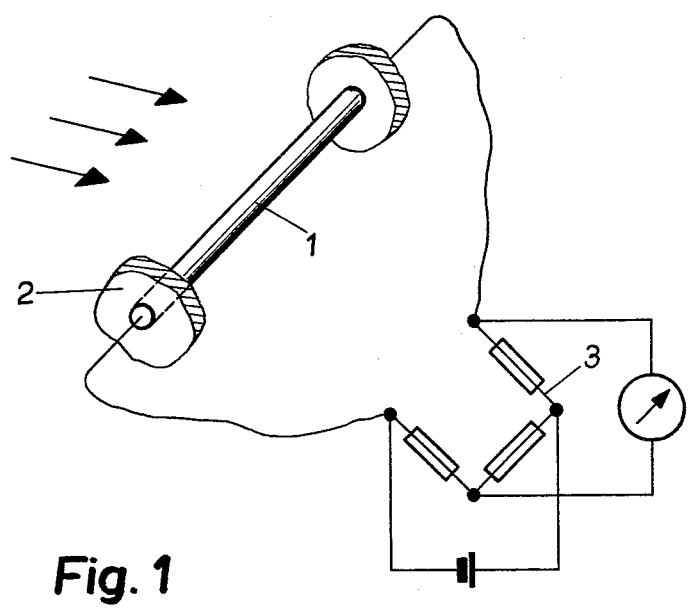
FIG. 1 shows an embodiment of the invention where an elastic vortex-generating bluff body acts at the same time as a transducer for measuring the deformation due to both the drag force and the buoyancy force.

The device in FIG. 1 consists of strain wire 1 as the vortex-generating bluff body, having two ends which are firxed in support 2. By interconnective wiring in measuring bridge 3, the deformation of the wire is converted into an electric signal.

Figure 2:
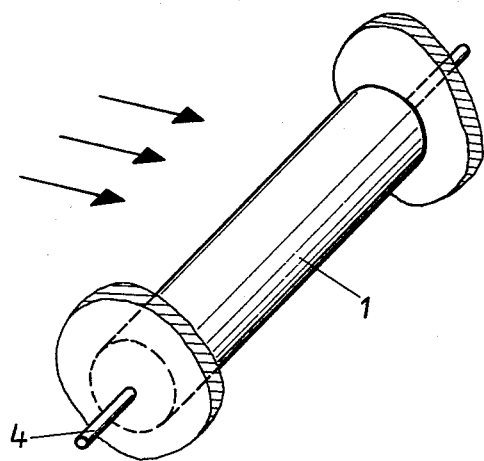
FIG. 2 shows an embodiment of the invention where one single strain wire or another single transducer is mounted in the bluff body which measures the deformation due to both the drag force and the buoyancy force.

According to the embodiment shown in FIG. 2, the deformation of bluff body 1 is determined by one single transducer 4. All vortex-generating bluff bodies according to the invention can be hollow and/or coated with a flexible material, e.g. plastic, in order to improve their bending behavior.

Figure 3:
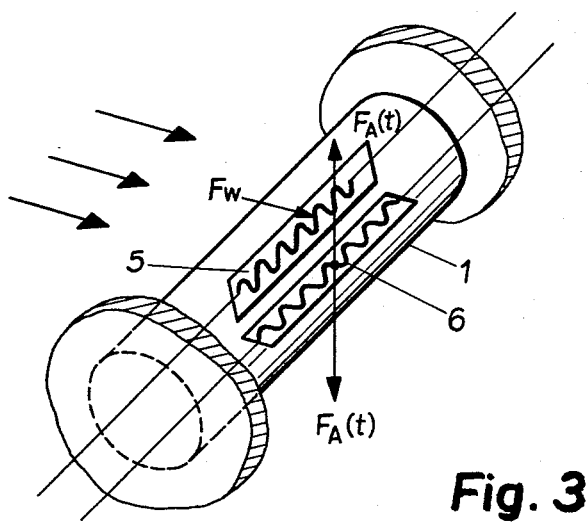
FIG. 3 shows an embodiment of the invention where two transducers are mounted in the bluff body, one of which measures only the deformation due to the drag force, while the other one measures only the deformation due to the buoyancy force.

According to the embodiment depicted in FIG. 3, two signals can be obtained by mounting two transducers 5 and 6 in hollow or solid vortex-generating bluff body 1 and arranging these two transducers such that transducer 5 determines the deformation due to the drag force and that transducer 6 determines only the deformation due to the buoyancy forces.

Figure 4:
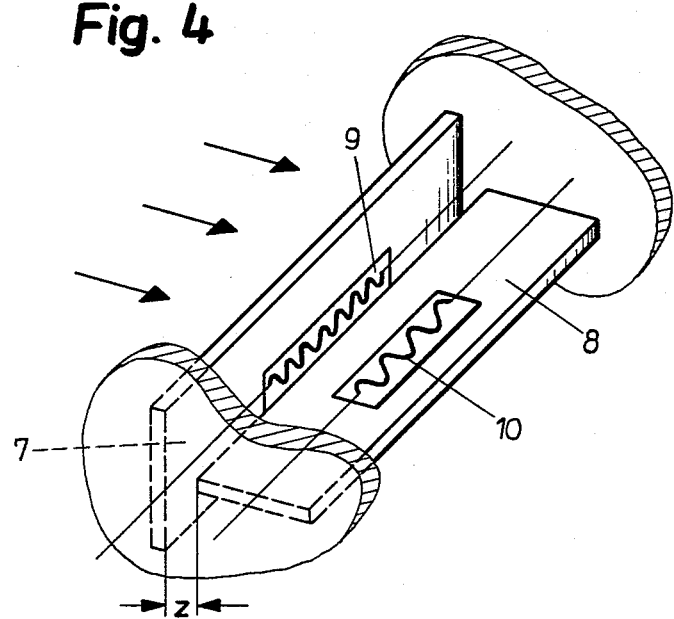
FIG. 4 shows an embodiment of the invention where the vortex-generating bluff body consists of two parts, each of which contains a transducer that determines the predominant deformation due to the drag force or the buoyancy force corresponding to the main axis of its areal moment of inertia.

According to FIG. 4, the bluff body may be made in two parts in order to improve the bending properties with respect to the effect of the drag force and the buoyancy force. The two parts 7 and 8, which are arranged at a right angle and contain transducers 5 and 6, are fixed at their ends. A certain gap is left between the two parts, in order to permit deflection of front part 7 by the drag force.

Figure 5:
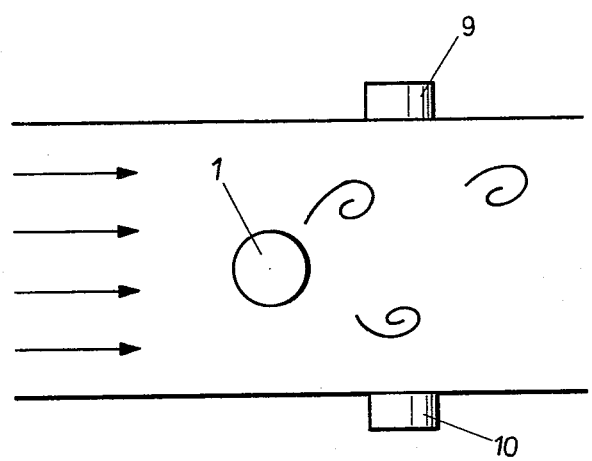
FIG. 5 shows a device according to the invention where an ultrasonic measuring system has been provided in addition to the bluff body.

The vortex frequency and thus the flow velocity can be measured, downstream of vortex-generating bluff body 1, without any contact with the flow and bluff body by means of an ultrasonic measuring system consisting of transmitter 9 and receiver 10. As shown by FIG. 5, transmitter and receiver are preferably mounted, in a matched manner, to the external wall of the channel.

In the embodiment of the device according to the invention depicted in FIG. 6, vortex-generating bluff body 1 is positioned in the flow by elastic support 11, e.g., a spring element. Bluff body 1 is equipped with plate 12 arranged in a direction normal to the direction of flow. On its rear side another plate 13 is provided which is mounted parallel to the direction of flow. This T-shaped extension of bluff body 1 increases the torsional moment. The transducers used in this embodiment are strain gauges 14, which are crosswise fixed to the front side and the rear side of support 11. The output signal that is obtained is evaluated as in the case of the above-described devices.

FIG. 7 shows that again vortex-generating bluff body 1 is used which has a T-shaped extension on its rear side. It can perform oscillations about an axis normal to the direction of flow. Torsional spring 15 generates a restoring force which operates to return bluff body 1 to the position of rest. In this case rotary potentiometer 16 is used as a transducer; the resultant signal is evaluated with respect to amplitude and frequency.

Figure 8:
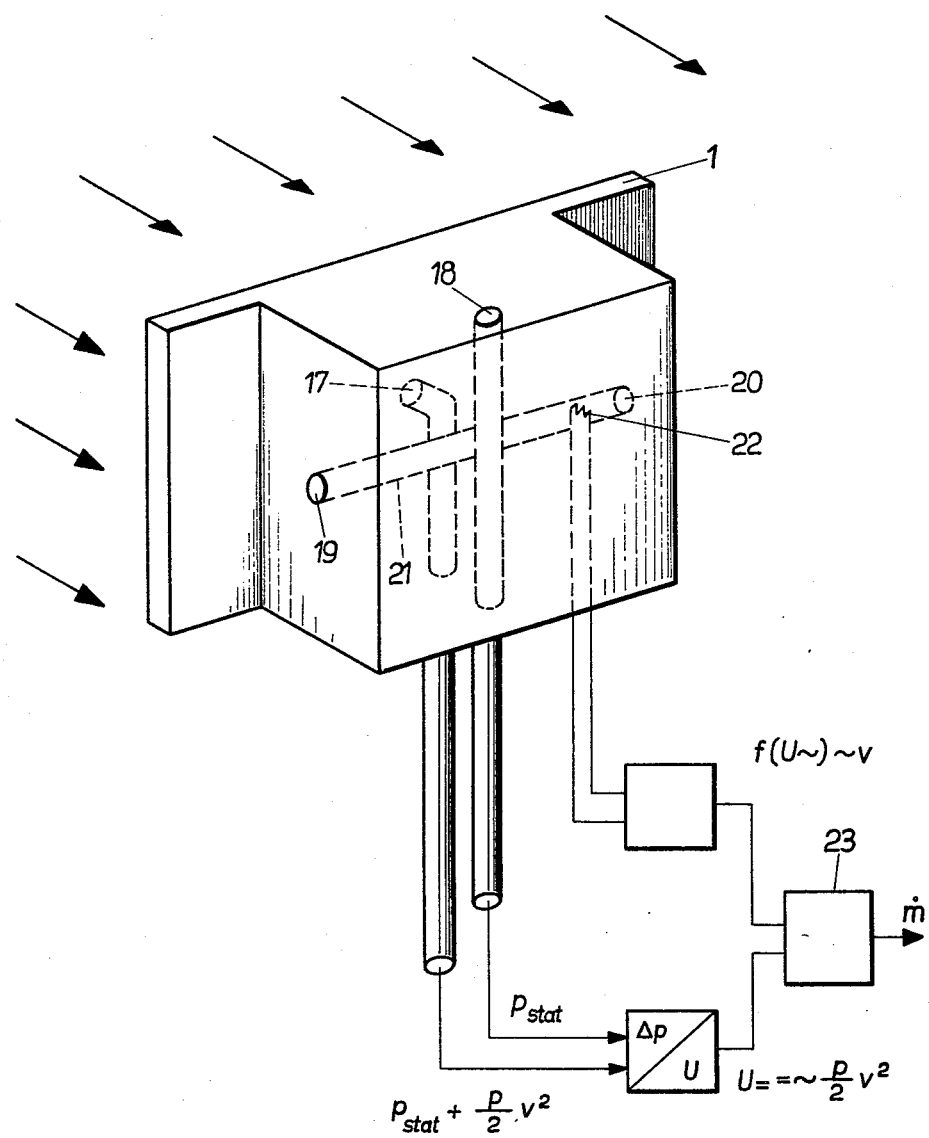
FIG. 8 shows a device consisting of a rigid vortex-generating bluff body provided with bores, which is to be mounted immovably in the flow.

The device depicted in FIG. 8 consists essentially of rigid vortex-generating bluff body 1 having surfaces which are normal and parallel to the direction of flow. To determine the dynamic pressure, two bores 17 and 18 have been provided, one of which leads to the front surface and the other one to a surface not adjacent to the dead water. Two additional openings 19 and 20, which are connected by channel 21, end in the dead water region on two opposite lateral surfaces. Hot-wire anemometer 22 is used for frequency measurement. The signals are evaluated in appropriate electronic system 23.

Figure 9:
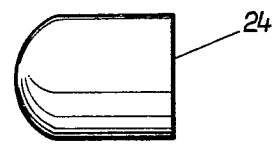
FIG. 9 is a side elevational view of another embodiment of the vortex-generating bluff body.

The vortex-generating bluff body may have different cross-sectional profiles. FIG. 9 shows sharp edges 24 at the rear surface of the bluff body for better vortex shedding.

Figure 10:
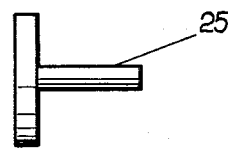
FIG. 10 is a side elevational view of another embodiment of the vortex-generating bluff body.

According to FIG. 10, surface 25 is arranged parallel to the direction of flow and may be provided to increase the buoyancy forces.

Figure 11:
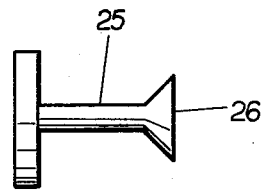
FIG. 11 is a side elevational view of another embodiment of the vortex-generating bluff body.
Figure 12:
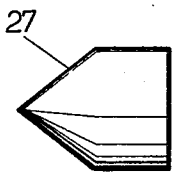
FIG. 12 is a side elevational view of another embodiment of the vortex-generating bluff body.
Figure 13:
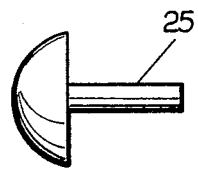
FIG. 13 is a side elevational view of another embodiment of the vortex-generating bluff body.

A further improvement can be achieved by the embodiment shown in FIG. 11, where surface 25 is parallel to the direction of flow and is provided at the rear surface of the vortex-generating bluff body. In addition guide vanes 26 are provided at the end of said surface 25 in order to improve vortex formation.

According to claim 12, it is possible to provide tapered surfaces 27 at the front side of the bluff body, which are inclined toward the direction of flow in order to deflect dirt or similar particles contained in the fluid.

In the embodiment according to claim 13, the front end of the bluff body is well rounded for the same purpose.

Figure 14:
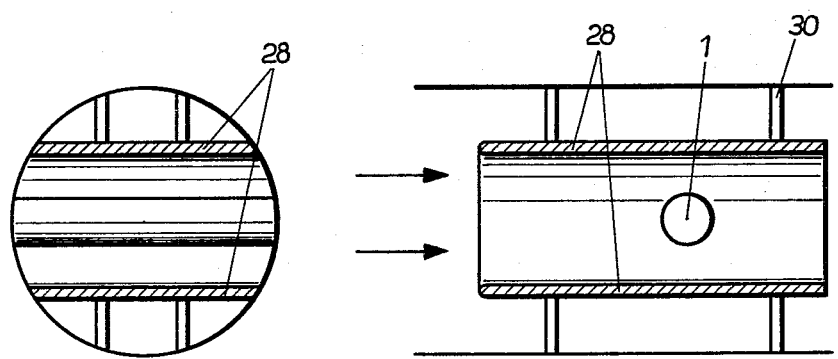
FIG. 14 shows one way of varying the contraction coefficient in the flow channel.

To adapt vortex-generating bluff body 1 to the flow conditions, the cross section of the flow channel can be changed. According to FIG. 14, this is achieved by mounting two plane, thin-walled guide plates 28—which may be fixed by supports—parallel to the direction of flow and parallel to and equally spaced from vortex-generating bluff body 1. The inlet edges in this embodiment should be well rounded and the lengths of plates 28 in front of and behind bluff body 1 should be such that the flow in the resultant inner measuring channel, through which only part of the mass flow of the fluid passes, is hydrodynamically developed.

Figure 15:
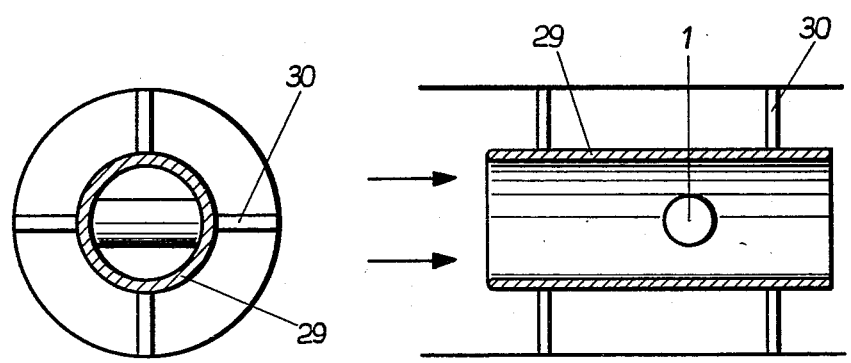
FIG. 15 shows another way of varying the contraction coefficient in the flow channel.

According to FIG. 15, the same effect is achieved by mounting coaxial measuring channel 29 in the flow channel, measuring channel 29 being passed only by part of the mass flow of fluid and the vortex-generating bluff body 1 being used only in measuring channel 29. The wall of measuring channel 29 should be thin and well rounded at the inlet. The length of measuring channel 29 in front of and behind bluff body 1 should ensure hydrodynamically-developed flow. Measuring channel 30 is positioned by supports 30 which are hollow and thus permit the electric signal lines from transducer(s) to be passed through the wall of the measuring channel 29 and the external wall of the flow channel.

We claim:

1. Method for the dynamic and density-independent determination of the mass flow of fluids, comprising placing a single, rigid, fixed vortex-generating bluff body in the flow to generate vortices according to the principal of the Karman vortex path, determining the dynamic pressure ($\frac{1}{2}\rho v^2$), wherein $\rho$ is the density and V is the velocity of flow, via the effect of the drag directly at said bluff body, said dynamic pressure being directly determined as an electric signal at said vortex-generating bluff body, determining the velocity of flow (v) via the effect of the vortex shedding at said bluff body, another electric signal being obtained which is due to the effect of the differential pressure generated by the vortex shedding in a direction normal to the direction of flow, the frequency of the latter signal being a measure of the flow velocity, and determining the mass flow (m) according to the equation:

$$\dot{m} = 2 \cdot (\tfrac{1}{2}\rho v^2) \cdot \tfrac{1}{v} \cdot A$$

wherein A is the cross section of the flow channel.

2. Method for the dynamic and density-independent determination of the mass flow of fluids, comprising placing a single, elastically-deformable, vortex-generating bluff body in the flow to generate vortices according to the principle of the Karman vortex path, determining the dynamic pressure ($\frac{1}{2}\rho v^2$), wherein $\rho$ is the density and V is the velocity of flow, via the effect of the drag directly at said bluff body, the deformation of said vortex-generating bluff body due to drag force being used to determine the dynamic force, determining the velocity of flow (v) via the effect of the vortex shedding at said bluff body, another electric signal being obtained from an ultrasonic measuring system consisting of a transmitter and a receiver and which is mounted downstream of the bluff body, the latter signal being a measure of the flow velocity, and determining the mass flow (m) according to the equation:

$$\dot{m} = 2 \cdot (\tfrac{1}{2}\rho v^2) \cdot (1/v) \cdot A$$

wherein A is the cross section of the flow channel.

3. Device for making a dynamic and density-independent determination of the mass flow of a fluid consisting essentially of a vortex-generating bluff body having at least one of its two ends fixed, said bluff body itself serving as a transducer or one or two transducers being provided on said bluff body, said vortex-generating bluff body being elastically deformable, being electrically conductive and having a cylindrical shape with a small diameter, the electric resistance of said bluff body changing upon deformation caused by said mass flow of fluid, said mass flow of fluid causing an electrical signal to result from said bluff body serving as a transducer or said one or two transducers, and an electronic system for processing the resultant electrical signal to make said determination.

4. Device as claimed in claim 3 wherein the vortex-generating bluff body has a large profile, and the bluff body or parts thereof are hollow or are coated with a flexible material, in order to improve the bending behavior of said bluff body.

5. Device as claimed in claim 4 wherein the flexible coating material is a plastic.

6. Device for making a dynamic and density-independent determination of the mass flow of a fluid consisting essentially of a vortex-generating bluff body having at least one of its two ends fixed, said vortex-generating bluff body being elastically deformable, said vortex-generating body consists of two parts which are connected at the ends, the moments of inertia of said two parts being optimized such that one of said parts predominantly determines the drag force, and the other of said parts predominantly determines the buoyancy force, two transducers arranged at right angles provided on said bluff body, one of the transducers predominantly determining the drag force of said mass flow of the fluid and the other transducer predominantly determining the buoyancy force of said mass flow of the fluid, said mass flow of fluid causing an electrical signal to result from said two transducers, and an electronic system for processing the resultant electrical signal to make said determination.

7. Device as claimed in claim 6 wherein the vortex-generating bluff body has a large profile, and the bluff body or parts thereof are hollow or are coated with a flexible material, in order to improve the bending behavior of said bluff body.

8. Device as claimed in claim 7 wherein the flexible coating material is a plastic.

9. Device for making a dynamic and density-independent determination of the mass flow of a fluid consisting essentially of a vortex-generating bluff body having at least one of its two ends fixed, the vortex-generating bluff body being elastically deformable and serving for measuring the drag force of the flow, said bluff body itself serving as a transducer or one or two transducers being provided on said bluff body, said mass flow of fluid causing an electrical signal to result from said bluff body serving as a transducer or said one or two transducers, an electronic system for processing the resultant electrical signal to make said determination, and an ultrasonic measuring system, which consists of a transmitter and a receiver and which can be fixed to the channel wall, is provided for measuring the vortex frequency.

10. Device as claimed in claim 9 wherein the vortex-generating bluff body has a large profile, and the bluff body or parts thereof are hollow or are coated with a flexible material, in order to improve the bending behavior of said bluff body.

11. Device as claimed in claim 10 wherein the flexible coating material is a plastic.

12. Device for making a dynamic and density-independent determination of the mass flow of a fluid consisting essentially of a vortex-generating bluff body having at least one of its two ends fixed, said vortex-generating bluff body being rigid and being fixed, said bluff body being provided with at least three bores, one of the bores ending at its front face and the other bores leading to its lateral faces parallel to the direction of flow, the front opening and one of the lateral openings serving for determining the dynamic pressure and those lateral openings which are arranged opposite to each other being used to determine the vortex shedding frequency, one or two transducers are provided on said bluff body, said mass flow of fluid causing an electrical signal to result from said transducers, transducers which convert the measured pressure values into electrical signals, and an electronic system for processing the resultant electrical signal to make said determination.

13. Device as claimed in claim 12 wherein two lateral openings, which are arranged opposite of each other, are connected, and wherein a hot-wire anemometer is provided in the connecting channel by means of which the frequency of the oscillating flow resulting from the pressure fluctuations is measured.

14. Device as claimed in claim 13 wherein the front face of the vortex-generating bluff body is curved or tapered toward the direction of flow, wherein the rear end of the bluff body is provided with at least one plane surfaces which are parallel to the direction of flow, wherein, at the ends of said plane surfaces, deflecting surfaces with sharp edges are provided, and wherein the bluff body has sharp lateral edges.

15. Device as claimed in claim 14 wherein said deflecting surfaces are tilted towards the direction of flow.

* * * * *